United States Patent
Bodine

[11] 3,837,239
[45] Sept. 24, 1974

[54] TORQUE CONVERTER TRANSMISSION SYSTEM

[76] Inventor: Albert G. Bodine, 13180 Mulholland Dr., Beverly Hills, Calif. 90210

[22] Filed: Sept. 18, 1972

[21] Appl. No.: 290,217

[52] U.S. Cl................ 74/843, 180/70 R, 123/46 R
[51] Int. Cl........................................... B60k 35/00
[58] Field of Search..... 74/843, 79; 180/70 R, 70 P; 192/48.3, 45; 123/46 B, 46 H, 46 R

[56] References Cited
UNITED STATES PATENTS

| | | | |
|---|---|---|---|
| 2,077,487 | 4/1937 | Lyman | 192/48.3 |
| 2,233,539 | 3/1941 | Landrum | 180/70 R |
| 2,473,204 | 6/1949 | Huber | 123/46 |
| 2,915,133 | 12/1959 | Kraus | 180/70 R |
| 2,959,237 | 11/1960 | Hill | 180/70 R |
| 3,037,573 | 6/1962 | Larsen | 180/70 P |
| 3,056,312 | 10/1962 | Timpner et al. | 180/70 R |
| 3,085,392 | 4/1963 | Sampietre | 123/46 |

Primary Examiner—Samuel Scott
Assistant Examiner—Wesley S. Ratliff, Jr.
Attorney, Agent, or Firm—Robert E. Geauque

[57] ABSTRACT

A kinetic energy transmission system incorporating a novel torque converter for controllably coupling a torsional oscillatory power source to a rotary output shaft. The torque converter comprises an elastic torsion bar having one end connected to the power source and the other end connected to a unidirectional rotary clutch. The oscillatory power source generates a resonant sonic wave pattern in the torsion bar. The clutch converts the torsional vibration output into unidirectional rotary motion at the output shaft. The application of a torque load to the output shaft acts as a restraint which is reflected back through the clutch so as to present an increased sonic impedance at the output end of the torsion bar. This causes the resonant pattern (nodes and anti-nodes) of the bar to shift and to deliver increased torsional force, commensurate with decreased torsional motion at the output shaft.

20 Claims, 1 Drawing Figure

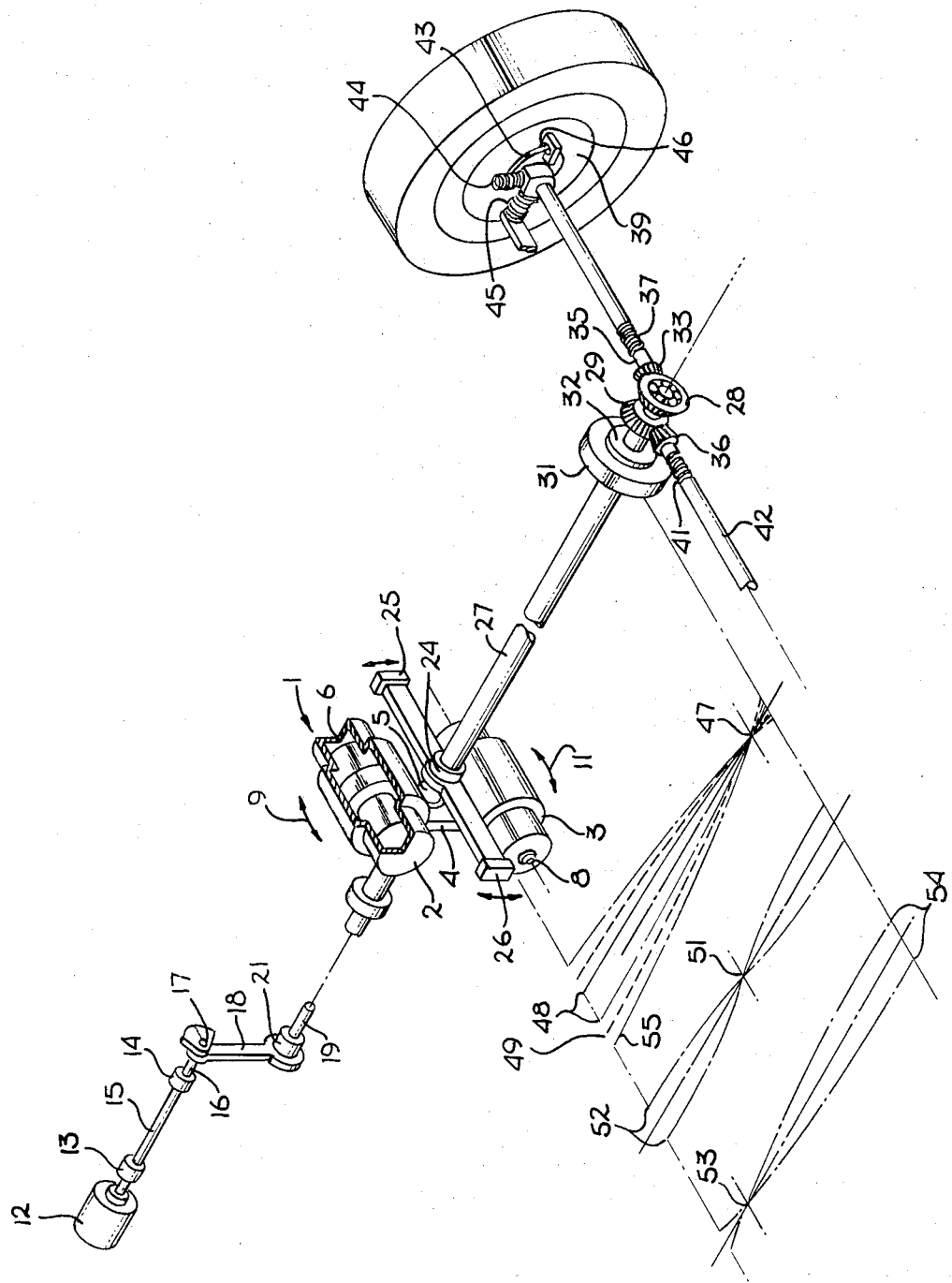

TORQUE CONVERTER TRANSMISSION SYSTEM

BACKGROUND OF THE INVENTION

The invention pertains to the field of mechanical apparatus for transmitting the power from a prime mover to a load-driving output shaft in accordance with the changing torque demands of applied load variations. More particularly, it pertains to a stepless continuously variable, automatic power transmission of the type suitable for use in automotive vehicles and the like.

Heretofore various kinds of automatic gear-changing mechanisms have been proposed for the purpose of increasing the available torque in response to increases in the output load. Since these prior mechanisms are adjustable only in discrete steps, they generally require complex fluid drives or automatic clutches for use therewith. Also, control means must be provided which respond to changes in the speed of the prime mover and/or the load shaft in order to affect the required step change in the gear ratio of the transmission. The complexity and shortcomings of such prior automatic transmissions are well known to those versed in the art.

There is a great need in industry for automatic transmissions of the infinitely-variable (viz., stepless) type because of the need to multiply torque smoothly over a wide torque range. It is further desired that such transmissions operate entirely automatically whereby the output torque increases smoothly and substantially instantaneously as the output load increases.

SUMMARY OF THE INVENTION

There is provided by the present invention a resonating sonic circuit for accomplishing the above-discussed stepless torque multiplication by working from the reaction of a dynamic oscillator which functions as the power source. Unlike the aforementioned gear-type transmissions, the apparatus of the present invention does not transmit the output torque reaction through countershafts and bearings with their undesired friction losses. That is, in a gear-type transmission, for each foot-pound of torque available at the output shaft, there is an equal foot-pound of torque developed in the transmission case. This internal torque is a result of a gear step-up such that side gears within the gear step-up are delivering high torque to the case. This torque is transmitted to the case via bearings, the result of which is high frictional losses.

The essential elements of the present invention comprise a mechanical oscillator which functions as the source of power, a one-way or unidirectional clutch, and a torsional resonator bar interposed therebetween. The output of the clutch is coupled to a rotary output shaft for driving the load. The desired torque multiplication is obtained by shifting the node in the resonant element. Under light load conditions the node is located closer to the oscillator and in effect an anti-node is located near the output so as to result in a relatively high velocity thereat. However, an increase in the load applied to the output of the system will raise the acoustic impedance at the output end of the resonant element. As a consequence, the resonant system will self-compensate by shifting the node of the resonant element closer to the output. As a consequence there will be a decrease in output velocity (motion) as must occur to conform with the laws of conservation of energy. As the node shifts towards the load end of the resonator, there will be a concurrent tendency to shift an anti-node towards the oscillator. The oscillator, then being near an anti-node, moves with greater velocity (motion) as is required to maintain an increasing torque at the output.

Under these conditions, the oscillator functions more or less as a constant force device. Its power output will tend to increase as its motion increases. As can be seen, the torque reaction is developed by an effect analogous to a lever, working from dynamic masses moving in orbital motion. The dynamic lever effect stems from the reaction developed by the moving masses.

It is, therefore, an object of the invention to provide a novel and improved automatic transmission system of the infinitely variable type.

Another object of the invention is to provide a novel and improved wide-range torque converter.

Still another object of the invention is to provide a novel and improved system for converting oscillatory motion to continuous rotary motion via a stepless automatic transmission.

It is another object of the invention to provide a novel and improved resonant vibration power system utilizing a torsion bar transmission element having a nodal region which automatically changes in accordance with changes in the load torque demand.

These and other objects of the invention will be more readily understood upon consideration of the accompanying drawing and specification which follows.

BRIEF DESCRIPTION OF THE DRAWING

The FIGURE is a somewhat diagrammatic perspective view of motive system of an automotive vehicle incorporating the apparatus of the invention.

Throughout the following description of the invention it will be useful in an understanding of the principles involved therein to employ electrical circuit analogies for the acoustical and mechanical systems. Thus, the use of terms such as impedance, capacitance, rectification, etc., will be used to describe mechanical analogs.

There is shown in the FIGURE a motive system for an automotive vehicle incorporating the torque converter transmission system of the invention. In the interest of clarity all of the conventional and well-known components of an automotive vehicle other than the engine and drive train have been omitted. It will be understood by those versed in the art that any of the several suitable and well-known ancillary devices and structure necessary to implement a complete vehicle may be employed. In the exemplary embodiment shown, the engine or prime mover comprises a simplified free piston engine 1. Reference may be made to my co-pending patent application Ser. No. 321,285, filed Jan. 5, 1973, entitled "Power System Utilizing Free-Piston Engine and Torsionally Resonant Transmission", for a more detailed description of a free-piston engine of a type suitable for practice of the present invention.

The engine 1 comprises first and second piston enclosing cylinders 2 and 3, each having closed ends and an intermediate enlarged diameter. The two cylinders (2 and 3) are interconnected by member 4 which is secured to shaft 5 for movement therewith. Each cylinder (2 and 3) contains a free, slidably mounted, piston such as indicated at 6. Encircling each piston (e.g., 6) is a centrally disposed scavenger piston. In all there are two double acting drive pistons and two double acting scavenger pistons in the engine. Each of the four cylinders is provided with a suitable ignition system including a spark plug such as indicated at 8. Also included, but not shown, is any suitable and well-known fuel injection system for supplying air and fuel to the two cylinders, and an exhaust system for removing the end products of the combustion cycle. The fuel, ignition, and exhaust systems are designed so as to alternately cause opposite chambers of the two cylinders (2 and 3) to fire simultaneously, but in opposite directions so as to develop a periodic couple. This arrangement will cause an oscillatory or rocking motion to occur about the axis of shaft 5, as indicated by arrows 9 and 11.

Starter motor 12, upon being electrically energized, produces a rotary output which is coupled via universal joints 13 and 14, and shafts 15 and 16, to swinging weight oscillator 17. Eccentrically mounted bell crank 18 transmits the oscillatory motion imparted thereto, to shaft 19 via starting clutch 21.

Torsional impulses imparted to shaft 19 are coupled to motor shaft 5 to start the engine. Arms 22 and 23 are coupled to the motor shaft 5 via clutch 24, and each arm carries a weight at its extremity (indicated at 25 and 26) to act as idling inductances (masses) for the oscillatory engine at the low speed end of its operating range. Motor shaft 5 is directly coupled to resonant torsion bar 27 which is the heart of the transmission system.

The prime mover portion of the system, as described thus far, comprises a free piston engine which in effect functions as a torsional oscillator having its output connected to a resonating system. The reaction from the internal combustion and motions of the pistons (6) are in a tangential direction so as to deliver torsional pulses through the cylinder assembly (2 and 3) to the output shaft 5. This results in the cylinder assembly rocking about a symmetrical axis and thereby deliver torsional resonant vibrations to the resonating system (viz., bar 27). The resonating system provides the restoring force to maintain the cyclical operation of the free piston engine. Heretofore, free piston engines have had considerable difficulty of operation owing to the fact that the piston return cycle relies upon having the free pistons bounce on an additional air spring. It is well known that the operation of these air springs is inherently very nonlinear and hence is not very good for maintaining the operating cycle. As a consequence, conventional free piston engines have a pronounced tendency to stop operating whenever there is even a momentary interruption in the compression cycle. This is because there is no "flywheel effect" to keep the engine running, and is especially noticeable under idling conditions.

Summarizing the characteristics of the prime mover portion of the system as above described, a simple free piston engine has its cylinder assembly tightly connected to the input end of the resonator, thereby forming the input inductance for the resonator. The free pistons, by their inductive reaction, deliver energy to the cylinder assembly which is also an inductance. In this instance the cylinder assembly is the inductance part of the resonator. Ths purely inductive coupling is very desirable in that the cylinder assembly can adjust its torsional stroke to the impedance conditions of the resonator. The pistons moving inside of the engine can have a relative stroke which is a function of the power of the internal combustion and the cylinder portion, and those other engine features which determine tye stroke of the piston. This means that the pistons can move with considerably greater effective stroke than is the travel of the cylinder assembly. It is the dynamic reaction of the reversals of the piston motion which develop the power in the system. As can be seen, the system embodies the simplest kind of piston engine which does not need connecting rods, crankshafts, and the many other complications of conventional internal combustion engines.

Bar 27 comprises an elastic resonant element to which torsional impulses are delivered by the prime mover. A pair of unidirectional or "one-way" clutches 28 and 29, each having an integral peripherally disposed bevel gear, is connected to the output end of bar 27 via flywheel 31 and cruise clutch 32. The bevel gear portion of clutch 28 mates with and drives gear 33. Similarly, the bevel gear portion of clutch 29 mates with and drives gear 34. Clutches 28 and 29 may comprise ratchets, sprag clutches, or other well-known devices of the type which convert oscillatory angular motion to unidirectional rotary motion. Each clutch (28 and 29) engages and turns its attached bevel gear (33 and 34) when bar 27 is tending to cause a turning motion in a given direction about the axis of the clutch mounting. When bar 27 is rotating in a first direction, a first one of the two clutches (28 or 29) will engage and the other clutch will disengage; when bar 27 rotates in the opposite direction, the other of the two clutches will engage, and the first clutch will disengage. In this way there will be no tendency to pull the bar 27 in a backward direction. In other words, each bevel gear experiences only half or a portion of half of each torsional cycle of bar 27.

The sprag clutches 28 and 29, comprising the motion rectifier, preferably have gears of fairly large diameter, and are lightly loaded as regards friction. This is possible because they do not encounter a high-velocity reverse cycle which would cause frictional heating. Light loading is especially desirable since these clutches must operate at relatively high frequencies such as the tappets in a conventional internal combustion engine. Shock loading is inherently light, however, because of the sinusoidal characteristic of the resonator's operating cycle. There is practically zero relative acceleration of the two races when the sprags close and pick up the torque.

Shaft 35 is connected to gear 33 and is responsive to the output of clutch 28. Similarly, shaft 36 is connected to gear 36 and is responsive to the output of clutch 29. The two shafts 35 and 36 will turn in the same direction because the bevel gears are in reverse orientation.

The operating frequency of the system is determined by the resonance of close-coupled circuit elements, involving piston masses, the cylinder assembly mass, the "combustion" spring effect, and the resonator spring. The resonator spring is the dominant effect because it is the most linear.

The two sprag clutches 28 and 29 provide, in effect, full-wave rectification of the motion of bar 27 so that each half of the oscillatory cycle of bar 27 is added in the output so as to give a continuous delivery of energy to the output. Even though there is full-wave rectification of the output, there still may remain an undesirable output "ripple." This may be overcome by the series insertion of a capacitance in the form of a torque spring. Second harmonic ripple is smoothed out by employing moderate capacitance in the output from the rectifiers (sprag clutches 28 and 29). By way of example, this can be obtained by the use of torsional compliance in the output shafts, such as in the axles which drive the rear wheels (39). As practically implemented this comprises coil spring 37 which is interposed between shaft 35 and shaft 38 or the inherent torsion spring properties of the wheel axles. Shaft 38 is drivingly coupled to wheel 39. Similarly, shaft 36 is coupled to shaft 42 via coil spring 41. Springs 37 and 41 comprise capacitive torque springs which filter out any residual pulsations so that the final output to the wheels (e.g., wheel 39) may be steady. Wheel 39 is carried on shaft 38 which is journalled in bushing 43 mounted on spring suspension 44 and drive spring 45.

The output of the system may be further smoothed by using low-speed inductive flywheel 31. The result will be a very steady continuous output rotation of the wheels. The wheels may, of course, be provided with conventional brakes such as indicated at 46.

Cruise clutch 32 permits the engine to be disengaged from the drive wheels when it is desired to speed up the engine without delivering power, or other like circumstances. If desired, double sprag clutches, or pairs of sprag clutches, connected in selectable opposition to each other, will permit the transmission to be placed in reverse by engaging and disengaging the proper corresponding pairs of sprag clutches.

The functioning of the above-described overall system is most easily understood by considering the elastic torsional bar 27 as a capacitance element of the system. Assuming that the oscillator housing (that is, cylinders 3 and 4 and their appurtenances) is heavier than the mass reactance in the rectifier region (that is, clutches 28 and 29), then the no-load starting phase will have a type of wave pattern or resonant condition where there are greater torsional oscillations in the rectifier region than there are at the oscillator. Since the node is closer to the oscillator than to the rectifier, the tendency will be to amplify the motion from the oscillator. Then, as a load torque is applied to the rectifier output, the output impedance of the system is increased. The consequence is that the node shifts away from the oscillator and moves towards the rectifier end of the resonator bar 27. If the system output were to be completely locked, (such as having the rear wheels of the vehicle tightly stuck in the mud) the node will move all of the way to the rectifier and result in a very high force being generated at the rectifier.

Considering now the operation of the system, it will be helpful to keep in mind that the resonator bar 27 is a kind of resonant torsion spring. The input termination end, at shaft 5, is twisting in one direction while the other end is twisting in the opposite turn direction. There will be a nodal region somewhere along the resonator bar 27 where the turning action is neutral. It is the automatic shifting of the location of this node along the resonator bar which is the phenomenon that provides the automatic transmission function.

Initially assume an idling condition with the rear wheels 39 braked. The resonator spring will attain its lowest idling speed (frequency) when it functions as a quarter wave length oscillator. In the idling condition the velocity antinode, as in all operating modes, will be at the input end of the bar 27. However, the velocity node (illustrated graphically at 47) during idle will be near the output end of the resonator bar 27 because of the rear wheels 39 being braked. The idle pattern of vibration is indicated by solid lines 48.

As the engine throttle is opened above idling speed, the acoustic circuit capacitance effect of the engine's combustion cycles becomes an increasing coupled capacitance constant, which further increases frequency and power capability. Assuming that the load remains high, the resonator bar 27 will continue to be substantially a one quarter wave length oscillator, with its node 47 near clutches 28 and 29, as the engine speed is increased from the idle speed. This start-up speed pattern is indicated by dashed lines 49. The persistence of the resonant pattern during start-up acceleration is due to the sustained high impedance at the output side of clutches 28 and 29. That is, the load imposed by substantial acceleration, starting on a hill, or being stuck in the mud, will cause a continued high impedance to be presented the resonant system.

Now, as the vehicle attains speed, the turning of the rear wheels 39 reduces the impedance at the output side of clutches 28 and 29. This will cause the node 47 to creep forward along the resonator bar 27 to a new location (as indicated at 51). As can be seen by the cruise mode pattern indicated at 52, there is an increase in antinode motion amplitude at the input side of clutches 28 and 29. This forward displacement of the node concurrently raises the resonant frequency of the system so that the engine can attain a higher operating speed. Under these conditions the system approaches peak horsepower capabilities as required for climbing a grade, or for high speed acceleration.

Since the transmission system of the invention has a substantial range, it is desirable to have an appreciable step-up gear ratio to begin with, such as by having large drive gears on the clutches (28 and 29) relative to the size of the axle pinions 33 and 36.

Assuming a high-speed cruise condition, the system's operating mode takes the form of a sort of overdrive. The location of the node is indicated at 53 and the overdrive pattern is indicated by lines 54. The minimization of the load impedance at clutches 28 and 29 gives a substantially "free" end (acoustically) for the output end of the resonator bar 27. The "lumped constant" effect of the engine oscillator (1) accordingly moves the node 53 forward towards the input (engine) end of bar 27. The engine frequency and amplitude drops accordingly, the phase angle between the piston (6) motion and oscillator (4) motion drops to a low power factor value, and the vehicle is in a low-power-demand cruise mode of operation. At the same time, the automatic transmission is at a maximum output speed ratio.

The process automatically reverses if a load starts to appear. The node 53 gradually moves back along the resonator (e.g., to 51, or 47). All of this happens gradually, with a truly infinitely smooth variable transmission or torque converting characteristic.

From the foregoing discussion it will be seen that by having the node shift its position along the resonator, force may be traded for motion. With a node close to the rectifier (sprag clutch) and an antinode close to the engine, the engine has a large motion and thus can deliver substantial power, and at the same time the rectifier can put a large torque into the load. When the node is near the engine, the opposite relationship occurs and an overdrive mode of operation exists. Thus, the power delivery of the system functions as a sort of automatic phase shifter wherein the phase of the piston motion can be made to change in relation to the phase of the energy in the main resonating system. In its simplest form the vehicle "free wheels". If this is undesirable, a braking function can be combined with any full rotation reverse of the sprag clutches 28 and 29.

As will be apparent to those versed in the art, certain modifications can be made in the above described invention. For example, the resonant idle speed can, if desired, be made an even lower frequency by having an idle inductance 25 and 26 which comprises a seismic mass clutched to the cylinder assembly (4) through a selectively controllable clutch 24. This increases the inductance of the oscillator body (the cylinder assembly 2, 3 and 4) and thus lowers the frequency. A manifold vacuum operated (or throttle servo) clutch causes this idle inductance to engage when the throttle is closed. When the throttle is opened, for power delivery from the engine, this idle inductance clutch 24 disengages and the oscillatory frequency of the engine correspondingly increases for higher engine speed.

The selectively clutched flywheel 31 at the output end of the resonator bar 27, engageable by means of clutch 32, is particularly useful for low gear maneuvering (as indicated by pattern 4e), such as creeping in traffic, negotiating rough terrain, or in reverse. Pattern 55 is typical of heavy pulling at low speed.

If desired, a forward-reverse gear box can be located between the rectifier and the axle drive. Alternatively, a pair of oppositely directed sprag clutches may be used in place of each single direction sprag. Forward or reverse is then selected by sprag deactivating separators in the sprag mechanisms, which hold up and deactivate the sprag in the undesired operating direction. Activating both directions of sprag, simultaneously, will serve as a parking brake.

Other modifications within the intended scope of the invention will become apparent to those versed in the art.

What is claimed is:

1. A torque converter transmission system comprising:
    a source of oscillatory kinetic energy for generating a cyclically reversing rocking motion at its output;
    an elastic torsion bar;
    means connecting one end of said bar to said energy source for torsional resonant excitation therefrom; and
    means connecting the other end of said bar to a mechanical load, whereby an increase in the impedance of said load will cause a shift in the torsional vibration nodal point of said excited bar towards said load, and a decrease in the impedance of said load will cause a shift in the torsional vibration nodal point of said excited bar towards said oscillatory source.

2. A system as defined in claim 1 wherein said oscillatory source comprises:
    a free piston engine.

3. A system as defined in claim 2 wherein said free piston engine comprises:
    a pair of piston and cylinder assemblies mounted in opposition for arcuate motion about a common axis.

4. A system as defined in claim 3 including:
    a pair of pivotally mounted weights mounted for rotation with said assemblies about said axis.

5. A system as defined in claim 1 wherein said bar comprises:
    an elongated elastic shaft of circular cross section having a first end secured to said energy source and supported with rotary freedom so as to permit elastic torsional vibrations to be efficiently propagated therein.

6. A system as defined in claim 1 including:
    a unidirection clutch connected to said other end of said bar for converting the cyclically reversing oscillatory vibrations of said bar to continuous unidirectional rotary motion.

7. A system as defined in claim 6 wherein said clutch is interposed between said other end of said bar and said load.

8. A system as defined in claim 6 wherein said clutch comprises:
    a sprag clutch.

9. A system as defined in claim 6 including:
    an inertial flywheel axially mounted on said other end of said bar for rotation therewith.

10. A system as defined in claim 1 including:
    a bidirectional-to-unidirectional angular motion converter interposed between said other end of said bar and said load.

11. A system as defined in claim 10 including:
    a capacitive spring element interposed between said motion converter and said load for smoothing vibrations tending to pass therethrough.

12. A torque converter transmission system, comprising:
    a mechanical oscillator for generating a cyclically reversing torsional oscillatory output force;
    an elastically resonant torsional vibration energy transmission means having an input termination and an output termination;
    means drivingly connecting the oscillatory output force of said oscillator to said input termination; and
    means drivingly connecting said output termination to a load, whereby the cyclically reversing torsional vibration energy from said oscillator is delivered in the form of turning forces to said load after having been transmitted through the impedance responsive circuit of said resonant transmission means, so as to cause the relationship of the input torque forces and the output torque forces to be subject to shifts in the torsional vibrational pattern of said resonant transmission means.

13. A system as defined in claim 12 including:
    a bidirectional-to-unidirectional angular motion converter means, having an input and an output, for rectification of said oscillatory output force;
    means drivingly connecting said output termination to the input of said motion converter; and
    means connecting the output of said motion converter to said load, whereby the cyclically reversing torsional vibration energy from said oscillator is delivered to said load in the form of single direction turning forces.

14. A system as defined in claim 12 wherein said oscillator comprises:
    a free piston internal combustion engine.

15. A system as defined in claim 13 wherein said motion converter comprises:
    a sprag clutch.

16. A torque converter transmission system for inclusion in the drive train of an automotive vehicle having a prime mover and a pair of traction wheels, comprising:
- means connected to said prime mover for producing a cyclically reversing oscillatory torsional force therefrom;
- an elastically resonant bar having an input termination connected to said torsional force producing means and having an output termination, and through which torsional vibration energy may be transmitted;
- first and second motion converter means connected to said output termination for changing the cyclically reversing torsional vibration energy derived from said bar to the form of single-direction turning forces; and
- means drivingly connected between the output of said motion converter means and corresponding wheels of said pair of traction wheels for rotation thereof.

17. A system as defined in claim 16 wherein said prime mover comprises:
- a free piston internal combustion engine.

18. A system as defined in claim 16 wherein said first and second motion converter means each comprise:
- a unidirectional clutch having an integral drive gear for mating with said drivingly connected means.

19. A system as defined in claim 16 including:
- first and second capacitive spring elements interposed between corresponding motion converter means and their respective traction wheels for smoothing the transfer of rotary motion thereto.

20. A system as defined in claim 16 including:
- an inertial flywheel axially mounted on said bar for movement therewith.

* * * * *